United States Patent
Macbeth

(10) Patent No.: US 6,538,863 B1
(45) Date of Patent: *Mar. 25, 2003

(54) ARC FAULT CIRCUIT PROTECTION DEVICE WITH ASYMMETRICAL TRANSFORMER

(75) Inventor: Bruce F. Macbeth, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/990,820

(22) Filed: Nov. 16, 2001

Related U.S. Application Data

(63) Continuation of application No. 09/694,612, filed on Oct. 23, 2000, which is a continuation of application No. 09/089,475, filed on Jun. 2, 1998, now Pat. No. 6,266,219.

(51) Int. Cl.$^7$ .................................................. H02H 5/00
(52) U.S. Cl. .............................. 361/42; 361/45; 361/78
(58) Field of Search .............................. 361/42, 45, 78, 361/93

(56) References Cited

U.S. PATENT DOCUMENTS 6,266,219 B1 * 7/2001 Macbeth et al. ............ 324/424

* cited by examiner

Primary Examiner—Stephen W. Jackson
(74) Attorney, Agent, or Firm—Wall Marjama & Bilinski LLP

(57) ABSTRACT

A protection device for an electrical circuit includes an asymmetrical transformer for producing a signal in response to an arc fault in the circuit; and an arc fault detector connected to the transformer which receives the signal. The asymmetrical transformer preferably includes a primary winding of the asymmetrical transformer being formed by a hot conductor and a neutral conductor of the electrical circuit. An asymmetry of a symmetrical secondary winding is produced by placing an asymmetrical tap into the symmetrical secondary winding of the transformer. The tap receives an asymmetrical part of common mode core flux to produce the signal, while the symmetrical secondary winding receives full common mode flux but in equal and opposite directions so as not to produce a signal.

15 Claims, 2 Drawing Sheets

ARC FAULT CIRCUIT PROTECTION DEVICE WITH ASYMMETRICAL TRANSFORMER

CROSS-REFERENCE TO RELATED APPLICATION

This is a continuation application of U.S. Ser. No. 09/694,612, filed Oct. 23, 2000, which is a continuation and in turn claims priority from U.S. Ser. No. 09/089,475 filed Jun. 2, 1998 U.S. Pat. No. 6,266,219, now allowed, the entirety of which is incorporated herein by reference.

FIELD OF THE INVENTION

This invention relates generally to the field of devices for protecting electrical circuits in the event of faults, and more particularly to a device for protecting a circuit against an arc fault employing an asymmetrical transformer.

BACKGROUND OF THE INVENTION

Ground fault circuit interrupters have become quite widely used and they provide the very useful function of disconnecting an electrical power source from a load when a ground fault is detected. Among the more common types of ground faults sensed by known ground fault circuit interrupters are those caused when a person accidentally makes contact with a hot electrical lead and ground. In the absence of a ground fault circuit interrupter, life threatening amounts of currents could flow through the body of the person.

Virtually all ground fault circuit interrupters use a differential current transformer for sensing ground faults. The current transformer is arranged with the hot and neutral leads of an electrical circuit passing through the center of a transformer, preferably a toroidal transformer with a symmetrically wound secondary formed thereon. In normal operation of an electrical circuit, the currents flowing through the hot electrical conductor and neutral electrical conductor are equal and opposite, so that no output signal is produced by the differential transformer. When a ground fault occurs, the currents are no longer the same, so the differential transformer produces a signal that can be sensed by appropriate signal conditioning circuitry to activate a relay or contactor or the like to interrupt the electrical circuit.

Ground fault circuit interrupters must also deal with fundamentally different types of faults that occur when the neutral conductor is connected to the ground conductor in the downstream circuit powered by the ground fault circuit interrupter, where the neutral and ground connections are intentionally but wrongly connected together, or by accidental short circuits formed, for example, when one strand of a stranded electrical conductor accidentally bridges the neutral and ground connections.

If a "grounded neutral" fault of the type just discussed occurs in a circuit in which the ground and neutral lines are connected together, and a person inadvertently makes contact with a hot electrical lead while also connected to the grounded neutral fault, the return current is divided between the neutral electrical conductor and the ground conductor. Only the neutral conductor passes through the differential transformer, so that only a fraction of the ground fault current is available to be sensed. The neutral electrical conductor can be a larger gauge wire than the ground conductor, and does not include resistive connections such as in conduit grounds; therefore, the larger portion of the ground fault current often flows in the neutral wire. In a circuit where a 6 milliamp ground fault current flows through a person, for example, it may result in three-quarters of the current flowing through the neutral wire where it is seen as a load current and therefore not detected, with only one quarter flowing through the ground conductor. Therefore, a much larger ground fault current must flow before the fault is detected, all to the detriment of the person through whom the ground fault current flows.

The problem just mentioned has been commonly addressed by providing a second transformer, sometimes referred to as a grounded neutral transformer. The second transformer is arranged with the hot and neutral lines extending through the core of the transformer, forming a first winding, with another winding wound on the toroidal core forming the second winding. Rather than sensing differential current through the second winding wound on the toroidal core, however, an oscillator is connected thereto, with the second winding of the grounded neutral transformer forming a part of the resonant circuit of the oscillator. In the absence of a ground neutral connection, there is insufficient feedback in the oscillator to initiate and sustain oscillation. However, when a grounded neutral fault occurs, it forms a closed coupling loop between differential and neutral transformers, creating a feedback path and initiating oscillation. The oscillation induces a current in the neutral lead that is detected in the same manner as a ground fault by the primary differential transformer.

Another approach to sensing grounded neutral faults is to provide a transformer through which only the neutral line of the electrical circuit passes. However, if a grounded neutral transformer is provided that has only the neutral line passing through it, it is not able to sense grounded neutral conditions that arise when an electrical circuit is inadvertently connected to the ground fault circuit interrupter with the hot and neutral cable wires reversed. Therefore, the grounded neutral transformer is preferably arranged with both the hot and neutral lines passing through the neutral transformer and forming two secondaries thereof. An arc fault cannot be readily sensed at such a transformer, and a third transformer is ordinarily provided for detecting arc faults, with the primary being only one of the hot and neutral leads.

Ground fault circuit interrupters of the types described detect both conventional ground faults and ground faults in the presence of intentional or accidental grounded-neutral faults. It is desirable to provide circuitry for detecting arc faults as well as ground faults. Arc faults are typically undetectable by the differential transformer or the grounded neutral transformer of a ground fault circuit interrupter because the wave forms produced by an arc fault appear on both the hot and neutral lines.

Because a differential ground fault sensing transformer must be as symmetrical as possible to reduce common mode response, signals indicating arc faults cannot be sensed from the secondary winding of the differential transformer.

The need for three transformers, a primary differential transformer for sensing ground faults, a grounded neutral transformer, and an arc fault sensing transformer, creates a particular problem. Often there is simply not enough room for all three transformers and their associated circuitry to be included in a package that fits in the space provided for a duplex receptacle.

SUMMARY OF THE INVENTION

Briefly stated, a protection device for an electrical circuit includes an asymmetrical transformer for producing a signal in response to an arc fault in the circuit; and an arc fault detector connected to the transformer which receives the signal. The asymmetrical transformer preferably includes a primary winding of the asymmetrical transformer being formed by a hot conductor and a neutral conductor of the electrical circuit. An asymmetry of a symmetrical secondary winding is produced by placing an asymmetrical tap into the symmetrical secondary winding of the transformer. The tap receives an asymmetrical part of common mode core flux to produce the signal, while the symmetrical secondary winding receives full common mode flux but in equal and opposite directions so as not to produce a signal.

According to an embodiment of the invention, a protection device for an electrical circuit includes an asymmetrical transformer for producing a signal in response to an arc fault in the circuit; and an arc fault detector connected to the transformer which receives the signal.

According to a feature of the invention, the asymmetrical transformer includes a primary winding of the asymmetrical transformer being formed by a hot conductor and a neutral conductor of the electrical circuit; a symmetrical secondary winding of the transformer; wherein an asymmetry of the symmetrical secondary winding is produced by placing an asymmetrical tap into the symmetrical secondary winding of the transformer, such that the tap receives an asymmetrical part of common mode core flux to produce the signal, whereas the symmetrical secondary winding receives full common mode flux but in equal and opposite directions so as not to produce a signal.

DETAILED DESCRIPTION OF THE PREFERRED EMBODIMENT

Figure 1:
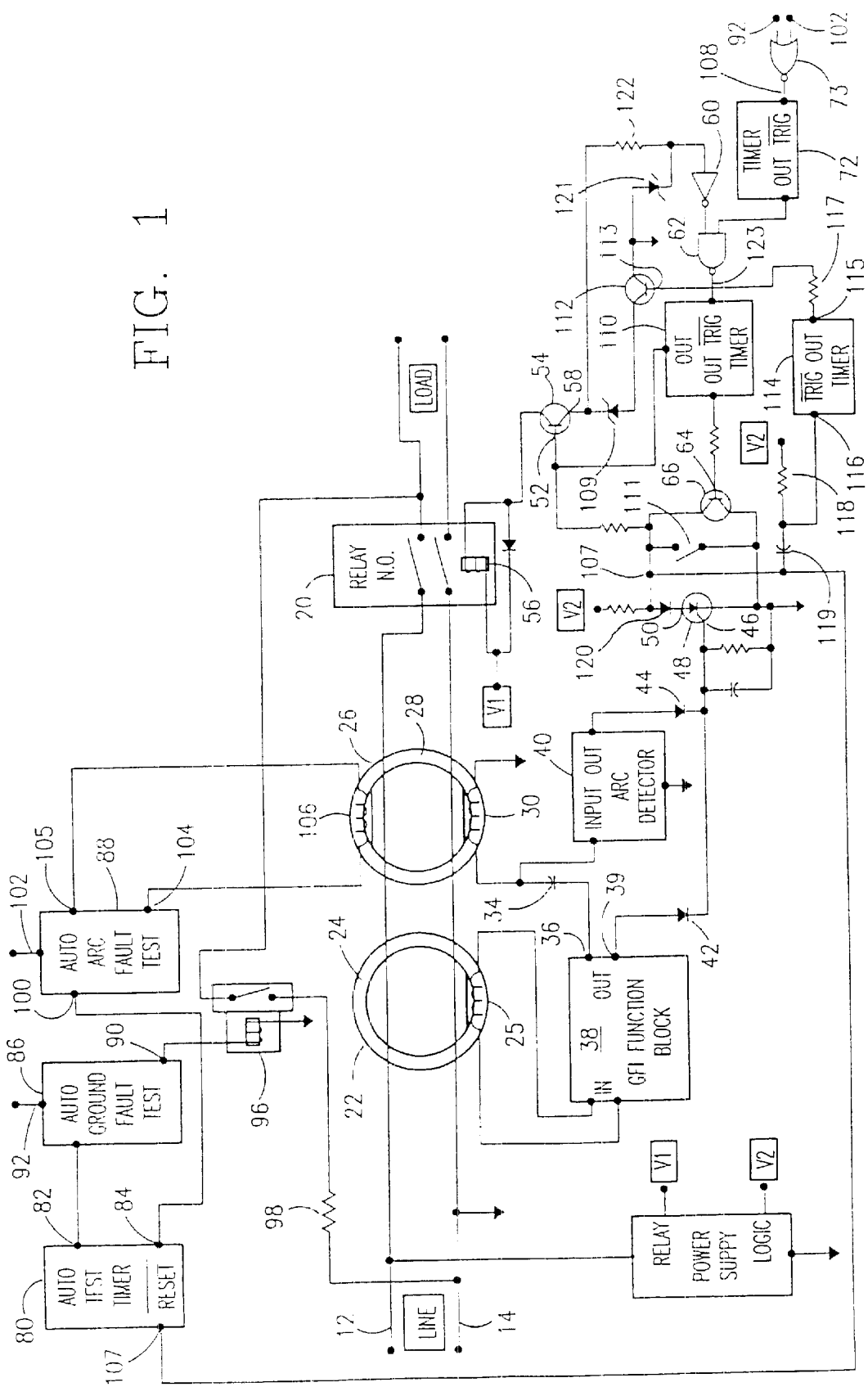
FIG. 1 shows a schematic diagram of a combined ground fault circuit interrupter and arc fault circuit interrupter.

Referring to FIG. 1, a schematic diagram of a combined ground fault circuit interrupter and arc fault circuit interrupter is shown. A hot electrical line 12 and a neutral electrical line 14 are connected between a primary power source and a load (not shown). A normally open electrical relay 20 or contactor is connected in circuit relationship between the power source and the load for interrupting the hot and neutral lines in the event of a fault.

A first differential current transformer 22, preferably formed on a toroidal core 24 of permeable material, is arranged with hot and neutral electrical conductors 12, 14 extending therethrough to form a differential primary. A symmetrical secondary winding 25 is preferably formed on toroidal core 24 for producing an electrical signal at its secondary corresponding to the differential current between the hot and neutral lines. Preferably, core 24 and winding 25 are constructed symmetrically so as to maximize common mode rejection, that is, to produce as close to a zero signal output as possible when the hot and neutral lines are carrying the same but opposite currents.

A ground fault circuit detector 38 is connected to secondary winding 25 of differential current transformer 22. The ground fault detector circuit may be of any of the arrangements known to those skilled in the art, and preferably includes an oscillator producing a signal at an output.

A second, asymmetrical, toroidal transformer 26 is also arranged with hot and neutral lines 12, 14 extending through a toroidal core forming a differential primary. An asymmetrical winding 30, such as a winding formed over only a portion of the circumference of the core, can be used to provide a differential signal at the output thereof that has low common mode rejection, that is, a signal which is more responsive to the current flowing in one of the conductors than the other. Alternatively, the toroidal core may be rendered unsymmetrical by filing a notch or otherwise removing a portion of the core at one or more discrete locations thereon, thereby reducing the common mode rejection of the transformer.

A capacitor 34 is connected to one end of secondary winding 30 to form a resonant circuit. The other end of capacitor 34 is connected to an oscillator output 36 in ground fault circuit detector 38 for providing an oscillating signal to the secondary of the transformer. Ground fault detector 38 produces an output signal at an output 39 when either a grounded neutral condition or a conventional ground fault exists, or both. Except for the use of an unsymmetrical transformer, the circuitry for detecting the grounded neutral condition is known to those skilled in the art. The use thereof in connection with an unsymmetrical transformer, however, is believed to be new.

Secondary winding 30 of transformer 26 is also connected to an arc fault circuit detector 40. Detector 40 is responsive to signals, produced on transformer 26 in response to arcing, that have a distinctive signature or pattern that can be discriminated by detector 40. Detectors of this type are per se well known. Because transformer 26 is asymmetrical, arc faults which do not produce a differential current are detected.

The output of ground fault/grounded neutral detector 38 and the output of arc fault detector 40 are connected in parallel by way of polarizing diodes 42, 44 to the input 46 of a switch such as an SCR 48. SCR 48 has its anode 50 connected to a base 52 of a switching transistor 54 that is connected to a coil 56 of the relay or contactor 20. When SCR 48 is activated by either a ground fault or an arc fault, the connection to the base of relay switching transistor 54 is bypassed, thereby switching transistor 54 and relay 20 out of conduction, and disconnecting the load. Activating a reset switch 11 resets the device.

The combined ground fault and arc fault circuit interrupter of this invention includes circuitry for periodically and automatically testing the ground fault and arc fault detectors, the switching circuits, and the relay without the need of operator intervention. An automatic test timer 80 produces pulses at a ground fault output 82 and an arc fault output 84 periodically. The pulses are preferably staggered, so that first the ground fault circuit is tested, then the arc fault circuit is tested, and then the cycle repeats continuously. The outputs 82, 84 of timer 80 are connected to a ground fault test circuit 86 and an arc fault test circuit 88 respectively. Ground fault test circuit 86 produces a high level signal 92 that is connected to one input of a NOR gate 73, and produces an energizing signal at a second output 90, which activates a fault relay 96 for simulating a ground fault current between hot electrical conductor 12 and neutral conductor 14 on opposite sides of transformer 22. A resistor 98 preferably generates a current of about 10 milliamps and therefore can be about a 15 k ohm resistor.

The second output 84 of timer 80 is connected to an input 100 of arc fault test circuit 88. Arc fault test circuit 88 produces a high logic level on a first output 102 thereof which is connected to the other input of NOR gate 73, and a simulated arc signal at its second outputs 104, 105 that are connected to a winding 106 on asymmetrical transformer 26 that is coupled to sense winding 30. Arc fault test circuit 88 generates a signal simulating the waveform produced by an actual arc to verify operation of the arc detector. The bypass fault current flowing through resistor 98 simulates a ground fault by causing a differential current to pass through transformer 24, thereby activating gfi block 38. Gfi block 38 produces an output signal at 39 which activates gate 46 of SCR 48. Conduction of SCR 48 pulls junction 107 low and resets auto test timer 80. A one-shot timer 72 briefly holds the active low state of signal 92, appearing at output 108 of NOR gate 73 when auto test timer 80 resets gfi test block 86. The output of timer 72 is connected to an input of a NAND gate 62. Activation of SCR 48 removes the base drive from transistor 54, which acts to disconnect the relay current from relay coil 56, and to drop the voltage across Zener diode 109 and transistor 112 to zero. The input of inverter 60 input is protected from overvoltage by Zener diode 121 and resistor 122. When the voltage at 58 drops to zero, inverter 60 activates the other input of NAND gate 62. NAND gate 62, with both inputs now held high, produces a low trigger signal 123 to activate a one-shot timer 110 which reconnects the base drive to transistor 54, and re-energizing relay coil 56 before relay contacts 20 can open. At the same time, timer 110 activates transistor 66, bypassing SCR 48, and switching SCR 48 out of conduction. A diode 120 insures that all SCR 48 current is bypassed through transistor 66. The time delay of timer 110 is set to be greater than the combined time delay of the opening of relay 96 plus any delay of gfi block 38 to remove gate drive from SCR 48. The above allows the circuitry to be checked without actually disconnecting the load. In a similar manner, when arc fault test circuit 88 is activated, afi block 40 causes the same sequence of momentarily disconnecting the relay coil 56.

Transistor 112, resistors 117 and 118, capacitor 119, and timer 114 form a fail safe circuit. Timer 114 is preferably of a type that reinitializes its time base at each trigger without causing the output to go low. Each time junction 107 is pulled low by the autotest sequence, timer trigger input 116 is pulled low by action of capacitor 119 charging. This keeps the timer constantly triggered, and the timer output high, holding transistor 112 in conduction via resistor 117. Resistor 118 acts to hold the trigger input 116 high, and inactive, if capacitor 119 is not periodically charged. The periodic charging must occur in a time less than the time constant of timer 114, or timer output 115 goes low and disables transistor 112. In this manner, if the test sequence is nonfunctional, transistor 112 stops conducting, thereby disengaging relay coil 56.

The periodic activation of the gfi test, and then the arc test, is set at a rate so that if either fails to produce a fault indication at junction 107, the periodic trigger pulse frequency appearing at tuner trigger 116 drops in half, which is too slow to keep timer 114 triggered, thus forcing fail safe transistor 112 to open, thereby de-energizing relay 20 and opening the load.

During the occurrence of an actual ground or arc fault, junction 107 is pulled low when SCR 48 is caused to conduct by either gfi block 38 or arc detector block 40. This holds autotest timer 80 in the off state and deactivates the auto reset function. Transistor 54 now stops conducting followed shortly by the opening of fail safe transistor 112. Either one of these transistors opens relay 20. The device stays in this state until a reset at 111 occurs.

It is to be understood that many of the timing and logic blocks and some or all of the test and detector blocks could be replaced by a microprocessor.

Figure 2:
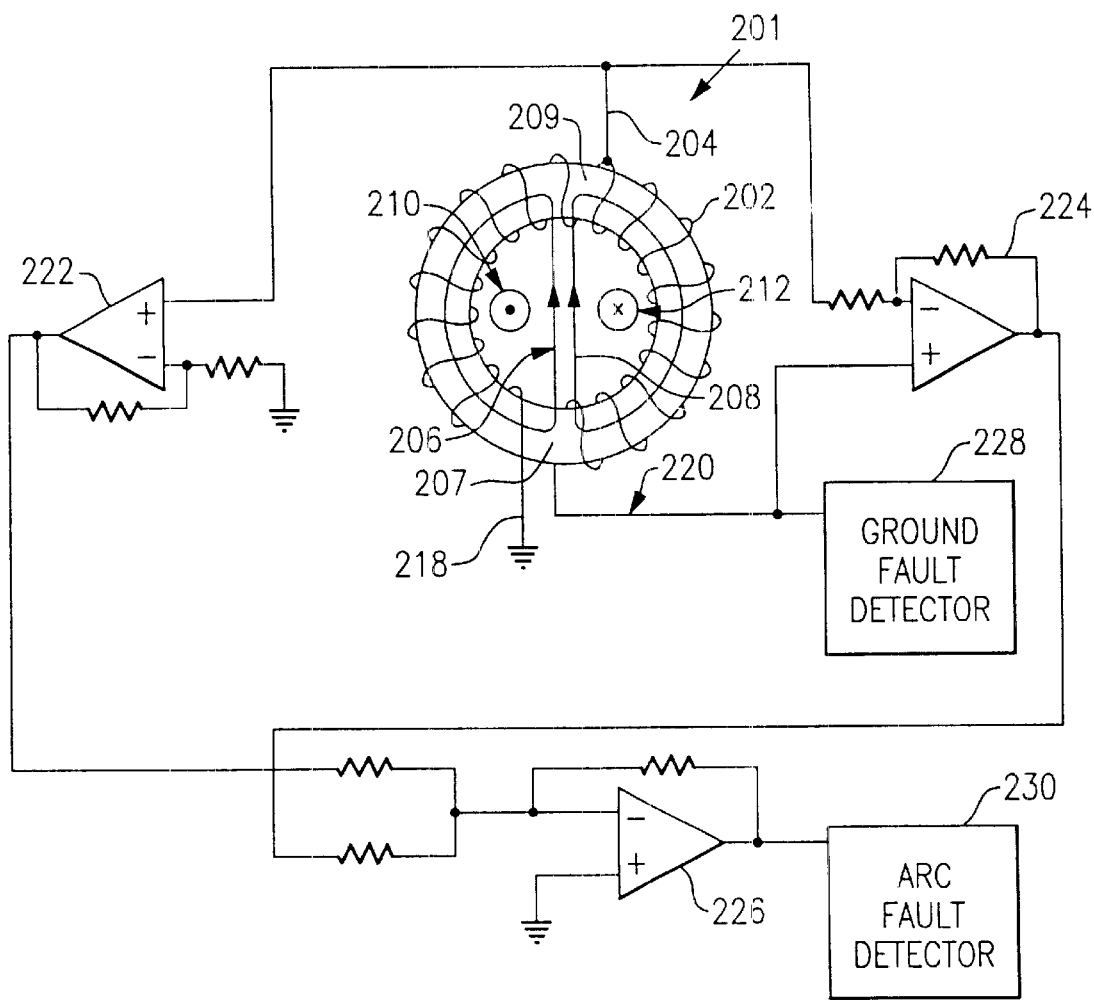
FIG. 2 shows an asymmetrical transformer formed by an asymmetrical tap on a symmetrical winding according to an embodiment of the invention.

Referring to FIG. 2, a transformer core 201, preferably ferrite, is wound with a complete, i.e., symmetrical, winding 202 as is required for differential current ground fault detection, but which full winding rejects common mode arc fault detection. Winding 202 has a tap 204 which forms the asymmetrical winding necessary for arc fault detection. A field line 206 formed around a transformer primary hot wire 210, with hot current coming out of the drawing toward the reader, and a field line 208 around a neutral primary wire 212, with current flowing into the paper, show the common mode field distribution within core 201 and how fields 206, 208 break out of core 201 at 207 and pass between wires 210, 212 before re-entering core 201 at 209.

Because the total winding is symmetrical, half the total winding receives a flux of one polarity while the other half receives a flux of the opposite polarity, with the opposite fields producing induced opposite voltages which cancel across the total winding. When a slight imbalance occurs in the current carried by hot and neutral wires 210 and 112 respectively, the imbalance causes a differential mode imbalance in fields 206 and 208 around each wire 210 and 212, which difference flux engages the full core 201 and the full permeability of the core 201. The full permeability of core 201 causes an increase in the field flux lines inside core 201, which in turn causes an output voltage to appear across winding 202 indicating a ground fault. The output voltage is detected by a ground fault detector 228.

For arc fault detection, when the induced voltage is sensed from tap 204 to a winding end 218, or from tap 204 to a winding end 220, then either induced voltage is present regardless of common mode detection or differential mode detection. For optimum detection of arc faults, the voltage from tap 204 to winding end 218 is amplified by a non-inverting amp 222 and the voltage from tap 204 to winding end 220, which is the opposite voltage polarity from tap 204 to winding end 218, is amplified by an inverting amp 224, with both signals, now in phase, being added together by a summer 226 to produce a signal which is the sum of the induced voltages across each winding half. In this way, the total signal across the winding halves, and which contain the arc fault di/dt, can be used by an arc fault detector 230.

Thus, a single transformer can be constructed which senses both arc faults and ground faults. Although the above explanation describes tap 204 as being connected at half of the winding, tap 204 could be at some other place in the winding, or optionally more than one tap could be used to obtain the asymmetrical arc fault signal take off.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A protection device for an electrical circuit, comprising:
   an asymmetrical transformer for producing a signal in response to an arc fault in said circuit; and
   an arc fault detector connected to said transformer which receives said signal.

2. A protection device according to claim 1, further comprising a hot electrical conductor and a neutral electrical conductor, wherein each conductor forms a primary winding of said asymmetrical transformer.

3. A protection device according to claim 2, in which said transformer produces an output signal that is more responsive to signals on a selected one of said hot and neutral conductors than to signals on the other conductor.

4. A protection device according to claim 2, in which said asymmetrical transformer includes a core selected from the group consisting of toroidal cores, sectional cores, and square cores.

5. A protection device according to claim 4, in which said asymmetrical transformer includes a first winding coupled to an oscillator for producing a grounded neutral transformer.

6. A protection device according to claim 5, in which said first winding of said asymmetrical transformer, which is used to generate a grounded neutral indicating sign, is also used as an output winding for an arc fault detection signal.

7. A protection device according to claim 1, in which said asymmetrical transformer includes a core having circumferentially non uniform magnetic characteristics.

8. A protection device according to claim 1, in which said asymmetrical transformer includes a core having a notch formed therein.

9. A protection device according to claim 1, further comprising a circuit interrupter operationally connected to said arc fault detector.

10. A protection device according to claim 1, further comprising an arc fault simulator coupled to said asymmetrical transformer for simulating an arc fault for verifying the operation of said protection device.

11. A protection device according to claim 1, wherein said asymmetrical transformer includes:

a primary winding of said asymmetrical transformer being formed by a hot conductor and a neutral conductor of said electrical circuit;

a symmetrical secondary winding of said transformer;

wherein an asymmetry of said symmetrical secondary winding is produced by placing an asymmetrical tap into said symmetrical secondary winding of said transformer, such that said tap receives an asymmetrical part of common mode transformer core flux to produce said signal, whereas said symmetrical secondary winding receives full common mode flux but in substantially equal and opposite directions so as not to produce a signal.

12. A protection device according to claim 11, wherein said transformer produces a second signal in response to a ground fault in said electrical circuit.

13. A protection device according to claim 12, further comprising a ground fault detector which receives said second signal.

14. A protection device according to claim 11, wherein symmetrical secondary winding connects to a ground fault detector.

15. A protection device according to claim 11, wherein an arc fault detector is connected to one end of said asymmetry of said symmetrical secondary winding.

\* \* \* \* \*